US009183700B2

(12) United States Patent
Allen et al.

(10) Patent No.: US 9,183,700 B2
(45) Date of Patent: Nov. 10, 2015

(54) GAME OF CHANCE UTILIZING SOCIAL NETWORK CONTACT ATTRIBUTES

(71) Applicant: WMS Gaming, Inc., Waukegan, IL (US)

(72) Inventors: Jeffrey L. Allen, Naperville, IL (US); Andrew C. Guinn, Chicago, IL (US); Damon E. Gura, Chicago, IL (US); Robert L. Kyte, Chicago, IL (US); Harry C. Lang, London (GB); Richard B. Robbins, Glenview, IL (US); Pamela S. Smith, Glenview, IL (US); Danijel Stankovic, Evanston, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 14/171,596

(22) Filed: Feb. 3, 2014

(65) Prior Publication Data

US 2014/0148245 A1 May 29, 2014

Related U.S. Application Data

(62) Division of application No. 13/464,964, filed on May 5, 2012, now Pat. No. 8,641,501.

(60) Provisional application No. 61/483,633, filed on May 6, 2011.

(51) Int. Cl.
*A63F 13/00* (2014.01)
*G07F 17/32* (2006.01)
(Continued)

(52) U.S. Cl.
CPC ........ *G07F 17/3227* (2013.01); *G06Q 30/0214* (2013.01); *G06Q 50/01* (2013.01);
(Continued)

(58) Field of Classification Search
CPC ............... G06Q 30/0214; G06Q 50/01; G07F 17/3272; G07F 17/34; G07F 17/3244; G07F 17/3262; G07F 17/3227; G07F 17/323; G07F 17/3239; G07F 17/3226; G07F 17/3267; G07F 17/3274; G07F 17/3281; G07F 17/3255; G07F 17/3225; A63F 2300/556; A63F 2300/407; A63F 2300/5546
USPC .......................................... 463/16–21, 40–42
See application file for complete search history.

(56) References Cited

U.S. PATENT DOCUMENTS 5,470,079 A 11/1995 LeStrange et al.
5,823,879 A 10/1998 Goldberg et al.
(Continued)

FOREIGN PATENT DOCUMENTS

GB          2490605      11/2012
WO    WO-2009042563      4/2009
WO    WO-2009086489      7/2009

OTHER PUBLICATIONS

"UK Application No. 1208182.4 Examination Report", Dec. 17, 2013, 5 pages.
(Continued)

*Primary Examiner* — Justin Myhr
(74) *Attorney, Agent, or Firm* — DeLizio Law, PLLC

(57) ABSTRACT

The disclosure includes a game of chance in which profile data for social contacts in a social networking system is used to determine whether a player wins or loses the game of chance. An indication that a first player desires to be included in a game provided on a social network system is stored. The game randomly selects a subset of a plurality of social contacts of a second player. In response to determining that the first player is included in the randomly selected subset of the plurality of social contacts, an award is provided to the first player.

20 Claims, 11 Drawing Sheets

(51) Int. Cl.
    *G06Q 30/02*     (2012.01)
    *G06Q 50/00*     (2012.01)
    *G07F 17/34*     (2006.01)
    *A63F 13/795*     (2014.01)

(52) U.S. Cl.
    CPC ......... *G07F 17/329* (2013.01); *G07F 17/3239* (2013.01); *G07F 17/3244* (2013.01); *G07F 17/3262* (2013.01); *G07F 17/3272* (2013.01); *G07F 17/3281* (2013.01); *G07F 17/34* (2013.01); *A63F 13/795* (2014.09); *G07F 17/323* (2013.01)

(56) References Cited

U.S. PATENT DOCUMENTS

| | | |
|---|---|---|
| 6,068,552 A | 5/2000 | Walker et al. |
| 6,110,041 A | 8/2000 | Walker et al. |
| 6,117,009 A | 9/2000 | Yoseloff |
| 6,142,872 A | 11/2000 | Walker et al. |
| 6,159,096 A | 12/2000 | Yoseloff |
| 6,254,483 B1 | 7/2001 | Acres |
| 6,342,010 B1 | 1/2002 | Slifer |
| 6,350,199 B1 | 2/2002 | Williams et al. |
| 6,358,150 B1 | 3/2002 | Mir et al. |
| 6,364,765 B1 | 4/2002 | Walker et al. |
| 6,394,899 B1 | 5/2002 | Walker |
| 6,520,856 B1 | 2/2003 | Walker et al. |
| 6,628,939 B2 | 9/2003 | Paulsen |
| 6,692,353 B2 | 2/2004 | Walker et al. |
| 6,699,125 B2 | 3/2004 | Kirmse et al. |
| 6,769,986 B2 | 8/2004 | Vancura |
| 6,843,724 B2 | 1/2005 | Walker et al. |
| 7,040,987 B2 | 5/2006 | Walker et al. |
| 7,169,052 B2 | 1/2007 | Beaulieu et al. |
| 7,240,093 B1 | 7/2007 | Danieli et al. |
| 7,311,608 B1 | 12/2007 | Danieli et al. |
| 7,458,894 B2 | 12/2008 | Danieli et al. |
| 7,559,838 B2 | 7/2009 | Walker et al. |
| 7,938,727 B1 | 5/2011 | Konkle |
| 8,167,712 B2 | 5/2012 | Sarkar et al. |
| 2002/0042296 A1 | 4/2002 | Walker et al. |
| 2002/0090985 A1 | 7/2002 | Tochner et al. |
| 2002/0111209 A1 | 8/2002 | Walker et al. |
| 2002/0142846 A1 | 10/2002 | Paulsen |
| 2002/0183105 A1 | 12/2002 | Cannon et al. |
| 2003/0003988 A1 | 1/2003 | Walker et al. |
| 2003/0224852 A1 | 12/2003 | Walker et al. |
| 2004/0180712 A1 | 9/2004 | Forman et al. |
| 2005/0043092 A1 | 2/2005 | Gauselmann |
| 2005/0054438 A1 | 3/2005 | Rothschild et al. |
| 2005/0071481 A1 | 3/2005 | Danieli |
| 2005/0170890 A1 | 8/2005 | Rowe et al. |
| 2005/0209001 A1 | 9/2005 | Moshal |
| 2005/0277469 A1 | 12/2005 | Pryzby et al. |
| 2005/0277474 A1 | 12/2005 | Barry |
| 2005/0289056 A1 | 12/2005 | Guinn |
| 2006/0160614 A1* | 7/2006 | Walker et al. .................. 463/29 |
| 2006/0247039 A1 | 11/2006 | Lerner et al. |
| 2006/0264257 A1 | 11/2006 | Jaffe et al. |
| 2006/0271959 A1 | 11/2006 | Jacoby et al. |
| 2007/0015584 A1 | 1/2007 | Frenkel |
| 2007/0054728 A1 | 3/2007 | Hood |
| 2007/0060380 A1 | 3/2007 | McMonigle et al. |
| 2007/0072677 A1 | 3/2007 | Lavoie et al. |
| 2007/0077988 A1 | 4/2007 | Friedman |
| 2007/0155507 A1 | 7/2007 | Gatto et al. |
| 2008/0004097 A1 | 1/2008 | Maya et al. |
| 2008/0009344 A1 | 1/2008 | Graham et al. |
| 2008/0064492 A1 | 3/2008 | Oosthoek |
| 2008/0102916 A1 | 5/2008 | Kovacs et al. |
| 2008/0234049 A1 | 9/2008 | LeBlanc et al. |
| 2008/0272541 A1 | 11/2008 | Walker et al. |
| 2009/0036196 A1 | 2/2009 | Ansari et al. |
| 2009/0093290 A1 | 4/2009 | Lutnick et al. |
| 2009/0117989 A1 | 5/2009 | Arezina et al. |
| 2009/0131163 A1 | 5/2009 | Arbogast et al. |
| 2009/0163267 A1 | 6/2009 | Fine |
| 2009/0170608 A1 | 7/2009 | Herrmann et al. |
| 2010/0019453 A1 | 1/2010 | Oakes et al. |
| 2010/0203963 A1 | 8/2010 | Allen et al. |
| 2010/0210358 A1 | 8/2010 | Csurka et al. |
| 2010/0279764 A1 | 11/2010 | Allen et al. |
| 2011/0092275 A1 | 4/2011 | Gagner et al. |
| 2011/0105229 A1 | 5/2011 | Sitrick |
| 2011/0143830 A1 | 6/2011 | Fine |
| 2011/0237321 A1 | 9/2011 | Fine |
| 2011/0300925 A1 | 12/2011 | Adiraju et al. |
| 2012/0094737 A1 | 4/2012 | Barclay et al. |
| 2012/0282995 A1 | 11/2012 | Allen et al. |
| 2013/0150150 A1 | 6/2013 | Allen et al. |
| 2013/0316818 A1 | 11/2013 | Earley et al. |

OTHER PUBLICATIONS

U.S. Appl. No. 13/464,964, filed May 5, 2012, Allen, Jeffrey L., et al.
U.S. Appl. No. 13/707,222, filed Dec. 17, 2012, Allen, Jeffrey L., et al.
U.S. Appl. No. 13/826,335, filed Mar. 14, 2013, Earley, Edward Q., et al.
"AU Application No. 2012202623 Examination Report", Apr. 15, 2013 , 8 pages.
"PCT Application No. PCT/US08/77310 International Preliminary Report on Patentability", Sep. 14, 2010 , 4 pages.
"PCT Application No. PCT/US08/77310 International Preliminary Report on Patentability", Apr. 1, 2010 , 6 pages.
"PCT Application No. PCT/US08/77310 International Search Report", Dec. 8, 2008 , 7 pages.
"PCT Application No. PCT/US08/88381 International Preliminary Report on Patentability", Aug. 16, 2010 , 12 pages.
"PCT Application No. PCT/US08/88381 International Search Report", Feb. 24, 2009 , 10 pages.
"UK Application No. 1208182.4 Examination Report", Sep. 3, 2012 , 9 Pages.
"U.S. Appl. No. 12/678,206 Office Action", Mar. 30, 2012 , 21 pages.
"U.S. Appl. No. 12/810,685 Final Office Action", Dec. 26, 2012 , 10 pages.
"U.S. Appl. No. 12/810,685 Office Action", Aug. 1, 2012 , 12 pages.
"U.S. Appl. No. 12/810,685 Office Action", Dec. 23, 2011 , 15 pages.
"U.S. Appl. No. 13/464,964 Office Action", May 30, 2013 , 21 pages.
Prizehearts, LLC, , "Lotto Love and Pals Available Next Generation Keno/Lottery Software", *24-7 Press Release* Apr. 5, 2006 , 2 pages.
"U.S. Appl. No. 13/717,222 Office Action", Mar. 17, 2014, 8 Pages.
"U.S. Appl. No. 13/826,335 Office Action", Nov. 20, 2014, 15 Pages.

* cited by examiner

1000

| SYMBOL HIERARCHY | MAPPED SYMBOL | CURRENT WEEKS FANTASY POINTS |
|---|---|---|
| HIGH 1 | PLAYER A | 19 |
| HIGH 2 | PLAYER B | 17 |
| MED 1 | PLAYER C | 14 |
| MED 2 | PLAYER D | 11 |
| LOW 1 | PLAYER E | 6 |
| LOW 2 | PLAYER F | 2 |
| BONUS | PLAYER G | 28 |
| WILD | PLAYER H | 22 |

GAME OF CHANCE UTILIZING SOCIAL NETWORK CONTACT ATTRIBUTES

RELATED APPLICATIONS

This application is a divisional application that claims priority benefit of U.S. application Ser. No. 13/464,964 filed 5 May 2012, which claims priority benefit of U.S. Provisional Application No. 61/483,633 filed 6 May 2011.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to games of chance, and more particularly to games that include social network contact data in the game mechanics.

BACKGROUND

The use of social networking systems such as Facebook and MySpace has dramatically grown over time. A feature that has been added to social network systems is the ability to play games within the social networking system. The games provide a mechanism for the game provider to obtain social contact data for the player and the player's contacts. The popularity of such games depends on the likelihood (or perceived likelihood) of winning the game and the intrinsic entertainment value of the game relative to other options. Shrewd game developers therefore strive to employ the most entertaining and exciting machines, features, and enhancements available because such games attract players and therefore increase the amount of profile data available to the game operator.

SUMMARY

A game system and its operations are described herein. In some embodiments, the operations can include storing an indication that a first player desires to be included in a game provided on a social network system. The game randomly selects a subset of a plurality of social contacts of a second player. In response to determining that the first player is included in the randomly selected subset of the plurality of social contacts, an award is provided to the first player.

BRIEF DESCRIPTION OF THE FIGURES

Embodiments of the invention are illustrated in the Figures of the accompanying drawings in which:

FIG. 10 illustrates an example mapping of third party data to game symbols.

DESCRIPTION OF THE EMBODIMENTS

This description of the embodiments is divided into five sections. The first section provides an introduction to embodiments of the invention, while the second section describes example operating environments. The third section describes example operations performed by some embodiments and the fourth section describes further example system architectures. The fifth section presents some general comments.

Introduction

This section provides an introduction to some embodiments of the invention. In general, the embodiments of the invention include a game of chance in which profile data for social contacts in a social networking system is used to determine whether a player wins or loses the game of chance. As used herein, a game of chance is a game that provides an uncertain outcome predominately determined by chance. Social contacts are randomly selected from a group of social contacts. The social contacts may come from a single source, or they may be aggregated from multiple sources. A game player wins if the randomly selected social contacts have one or more profile attributes that match each other. In some embodiments, the one or more profile attributes match both the player's attribute and the randomly selected social contacts' attributes. In particular embodiments, the game is presented as a slots based game in which profile pictures for the social contacts are the symbols for the reels of the slots game.

Operating Environment

This section describes an example operating environment and presents structural aspects of some embodiments.

Figure 1:
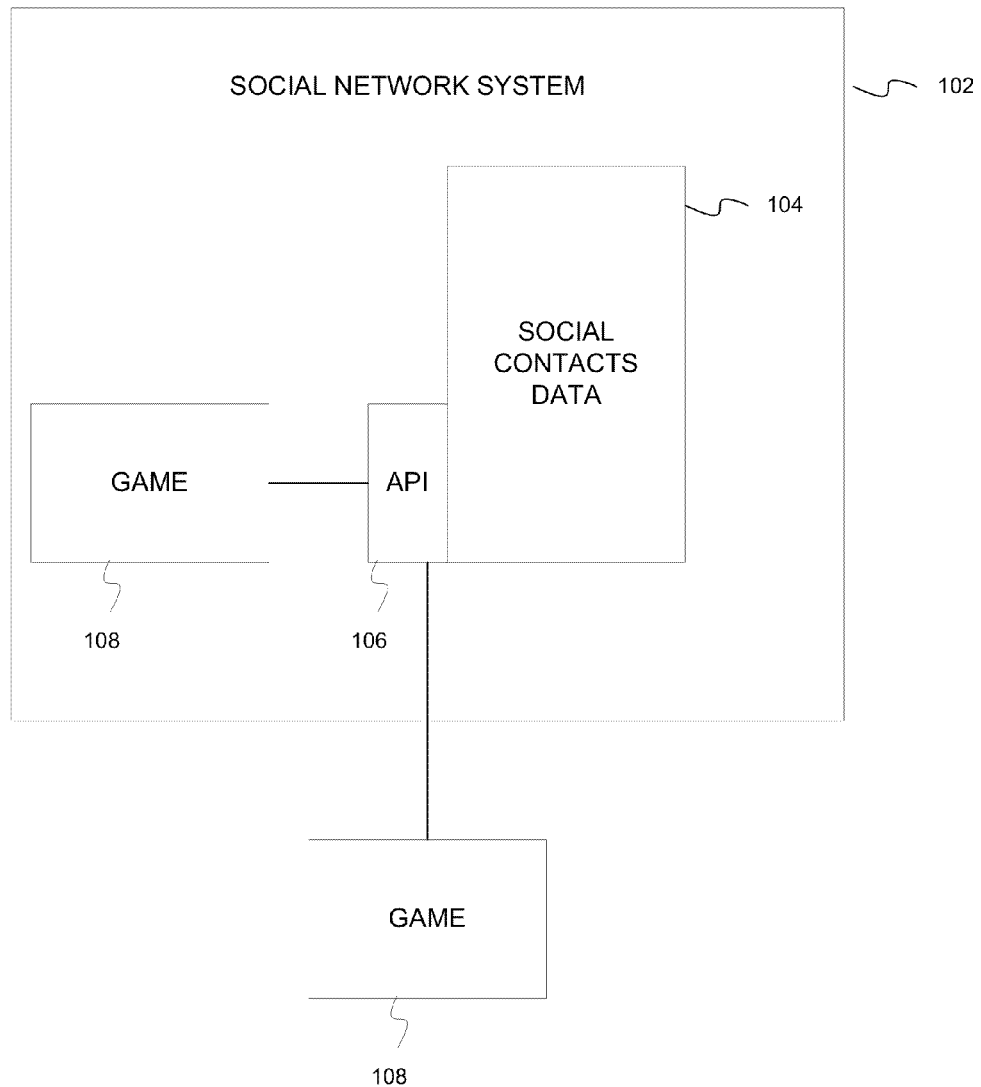
FIG. 1 illustrates a general operating environment in which embodiments of the invention may be practiced.

FIG. 1 illustrates a general operating environment 100 in which embodiments of the invention may be practiced. Operating environment 100 includes a social network system 102 and a game 108. Examples of such social network systems include Facebook, MySpace, and LinkedIn. The embodiments of the invention are not limited to any particular social network system. Generally speaking, social network system 102 is a system that maintains a set of social contacts. Such social contacts may be friends, acquaintances, business colleagues, family members etc.

Social network system 102 maintains social contacts data 104 for users of social network system 102. Such social contacts data includes lists of social contacts associated with a user. Social contacts can be online friends (e.g., Facebook friends), links (e.g., LinkedIn), business contacts, contacts from online address books, members of fantasy sports leagues or other social network contacts. Additionally, social contacts data includes attributes of the social contacts. Examples of such attributes may include various combinations of name, current address, previous addresses, age, birth date, gender, relationship status, physical attributes, personal likes and dislikes, educational background, employment background etc. In general, social contacts data includes any demographic or other data about a person that may be available from an available data source. The set of attributes for a particular social contact may be referred to as a profile. Social network system 102 may provide an API (Application Program Interface) 106 that allows applications such as game 108 to access the lists of social contacts and social contact attributes maintained in social contacts data 104.

Game 108 is a game of chance that uses the social contact data as part of the game mechanics. Game 108 may be any type of game of chance. In some embodiments, game 108 is a video slot machine game. In alternative embodiments, game 108 may be a card game, a simulated race (such as a horse race or car race), a dice game, or other game of chance. Further details on the operation of game 108 and the integration of social contact data in the mechanics of game 108 are provided below.

In some embodiments, game 108 is hosted by the social network system and operates within a software framework provided by social network system 102. In alternative embodiments, game 108 is hosted by a separate system or server and operates outside of the software framework provided by social network system. In either case, game 108 may use API 106 to extract the desired social contact data 104.

Although FIG. 1 describes some embodiments, the following sections describe many other features and embodiments.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

This section will discuss FIGS. 2-7. The discussion of FIGS. 2-6 will describe operations for providing a game of chance that utilizes profile data for social network contacts to determine whether a player wins the game. The discussion of FIG. 7 will describe operations for providing additional awards when profile data of a first player is part of a winning combination of social contact for a game of chance played by a second player.

Figure 2:
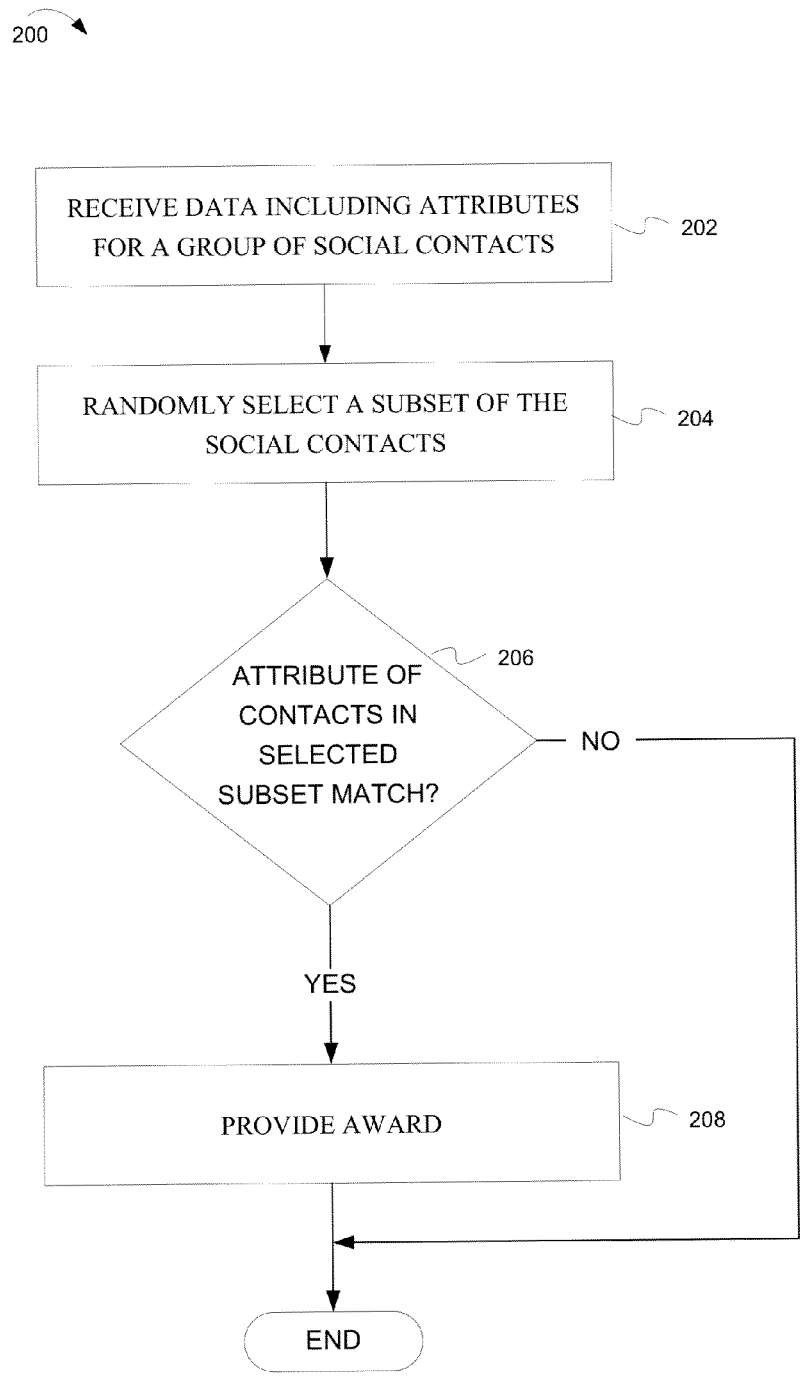
FIG. 2 is a flowchart illustrating a method for using social contact data from a social networking system into a game of chance.

FIG. 2 is a flowchart illustrating a method 200 for implementing a game of chance using social contact data. The method begins at block 202 by receiving data for a group of social contacts. The data may include lists of contacts, and will include profile attributes for the contacts. As noted above, such attributes can include name, current address, previous addresses, age, birth date, gender, relationship status, physical attributes, personal likes and dislikes, educational background, employment background etc.

Various embodiments may use different domains of data for the group of social contacts. In some embodiments, the group may include a set of social contacts associated with a player (e.g., "friends" of a player). The group may further include indirect social contacts (e.g., "friends of friends").

In alternative embodiments, the group of social contacts may include contacts that share a particular characteristic or are interested in a particular topic. For example, a group may include social contacts that are interested in or have indicated they like a particular sport, a particular team, a particular band, a particular activity or a particular event. The characteristic or interest may be self-identified, that is, the user indicates an interest or characteristic. Alternatively, the interest or characteristic may be inferred based on the user's profile or activity on the social network such as indicating the user "likes" or "dislikes" particular postings on the social network. The social contacts may be included in such a group regardless of whether or not they are associated with the player.

In further alternative embodiments, the group of social contacts may be selected by a player. The player may select friends, family members or other persons for inclusion in the group. In some embodiments, selection of a social contact may include sending an invitation to the social contact to participate in the game of chance.

Other groupings of social contacts may be used and are well within the scope of the inventive subject matter.

In order for a social contact to be included in the group of social contact, some embodiments may determine whether or not the social contact has provided permission for the game of chance to access the contact's profile information. If such permission has not been provided, the social contact is not included in the group.

At block 204, the game randomly selects a subset of the social contacts from the group of social contacts. The number of contacts in the selected subset may vary depending on the type of game being played. In some embodiments, the game is a slots based game of chance that simulates the operation of a slot machine. The symbols for the simulated slot machine may be images associated with the selected social contacts, for example, the contact's profile picture. In such a game, the number of randomly selected social contacts in the subset will be the number of simulated reels. Various other slot mechanics may be made part of the game. For example, an interface allowing a player to stop a reel or reels at a desired time, or nudge a reel or reels to a different position may be part of the game. Additionally, various styles of reel mechanics and reel configurations may be used in various embodiments. For example, the reels may be cascading reels or wrap-around reels. The reels may further be configured as a "Rubik's Cube", with profile pictures appearing on the faces of the cube. A user interface in such an embodiment may allow a player to align the sides of a cube with profile pictures of users that have matching characteristics.

In a card based game, the number of randomly selected social contacts in the subset may be the number of cards in a hand and the profile pictures may be used as symbols on the cards. In a dice based game, a profile picture may appear on the face of a die, and matches determined according characteristics of the profiles that result from a simulated throw of a set of dice having profile pictures. In a video scratch card based game, profile pictures may be placed under the scratch-off area.

As noted above, the pictures used as slot reel symbols, card symbols, dice symbols or other game elements are profile pictures. In alternative embodiments, other pictures may be used. For example, pictures that have been tagged with a social contact (e.g., having metadata indicating the name or other identification of the social contact in the picture) may be used as a game symbol.

At block 206, the game determines if one or more profile attributes shared by the randomly selected subset of social contacts match. For example, in some embodiments, the game determines a match exists if all of the randomly selected contacts have the same age. Various types of matching may be used in different embodiments. In some embodiments, the game may require an exact match. In other embodiments, fuzzy matching may be employed. For example, rather than requiring an exact match on age, the game may determine a match exists if the ages are within the same decade, or within the five years of one another. Additionally, the game may determine that matches exist for more than one attribute.

At block 208, if the game determines that a match on at least one profile attribute shared by the randomly selected social contacts exists, then the game provides an award to the player. In some embodiments, the award may be points. The points awarded may vary depending on the number of matching attributes. Further, the points awarded may vary depending on the odds of a match on the attribute value. For example, an exact match on ages within the randomly selected social contacts is less likely than a match on astrological sign, where there are only twelve possible values. Therefore the game may award more points for an exact match on age than would be awarded for a match on astrological sign.

In alternative embodiments, the award may comprise unlocking a feature of the game of chance, or a feature of a different game. For example, the award may unlock a bonus game or feature associated with a wagering game available at a casino. Additionally, the award may unlock an episode of a bonus game for a wagering game. Alternatively, the award may unlock or make available characters, character attributes (clothing, appearance, tools etc.) for a bonus game associated with a wagering game. When the player goes to a casino to play the wagering game, the bonus game, episode, character or other feature is made available to the player.

Other awards may be provided in addition to, or instead of points. For example, in some embodiments, a virtual trophy, medal or badge may be awarded. In alternative embodiments, discounts coupons or certificates for goods or services may be awarded. The discount coupon or certificate may be for a good or service that is known or assumed to be of interest to the player. For example, if the group of social contacts includes those users who have expressed an interest in hockey, then the discount coupon or certificate may be for discounted hockey tickets or hockey equipment. In some embodiments, a player, prior to a game, selects one or more discount coupons that the player may be interested in. Upon winning a game, one or more of the preselected coupons may be awarded to the player.

Figure 3:
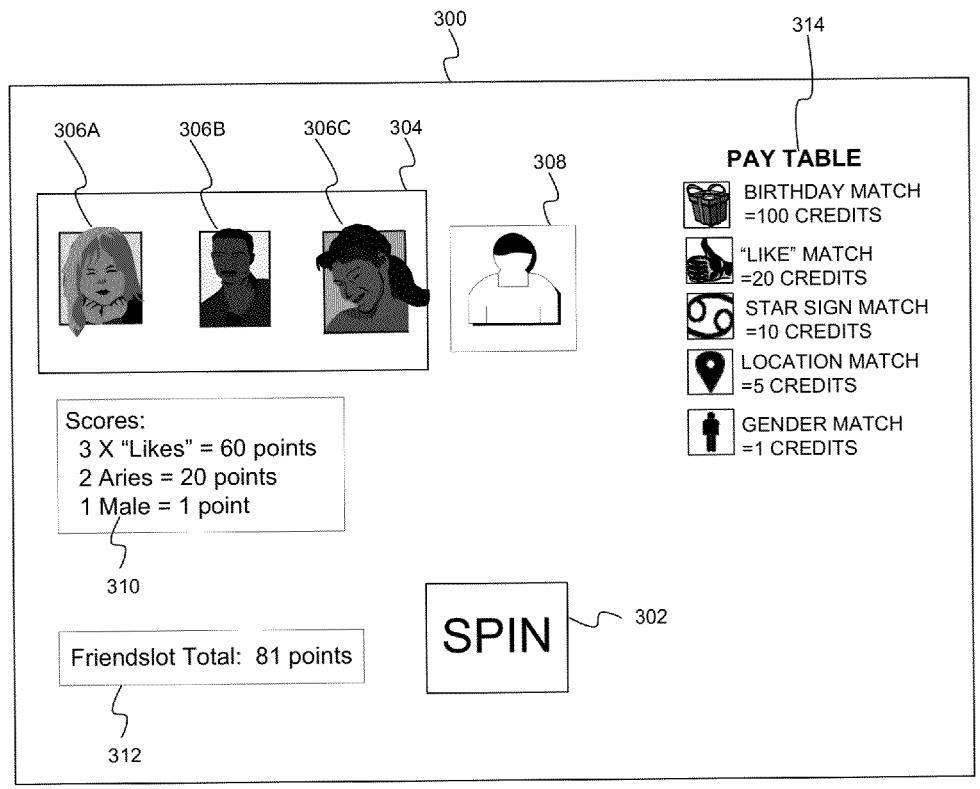
FIGS. 3 and 4 are example user interfaces for a game of chance incorporating social network data.

FIG. 3 illustrates an example user interface 300 for a game according to embodiments of the invention. The example interface shown in FIG. 3 is an example interface for a slot based game application incorporating social contact profile data in the game mechanics. Interface 300 includes a spin button 302, reel symbol group 304, spin score 310 and total score 312. Spin button 302 provide an interface to initiate a new round of the game by randomly selecting a subset of social network contacts. The images representing reel symbols (i.e., the contact's profile image) make up the reel symbols in reel symbol group 304. In the example shown, three reels 306A-C are used in the game. Those of skill in the art having the benefit of the disclosure will appreciate that a slots based game may have more or fewer reel symbols arranged in various grid combinations. For example, in alternative embodiments, nine symbols in a three by three grid may be used. Further alternative embodiments may have other symbol and grid size arrangements such as three by five, five by five, four by four etc. In the embodiment shown in FIG. 3, a fourth reel symbol 308 is included as part of the game. Reel symbol 308 represent the player's social contact profile data. In some embodiments, the match rules require that attribute values of the randomly selected social contacts match attribute values of the player. In such embodiments, the randomly selected social contacts change with each spin, while the final reel, representing the player, does not change. In alternative embodiments, matching of profile attribute values may be based on the randomly selected social contact and need not include the profile attribute values of the player.

Spin score 310 provides a scoring of the outcome of the current play (in this example, a spin) of the game. In the example shown in FIG. 3, the outcome of the current round of the game indicates that the three randomly selected social contacts whose profile images appear as reel symbols 306A-C had attributes whose values matched each other's attribute values and attribute values for the player. Thus the game awarded 25 points based on the fact that each of the three randomly selected social contacts have ages in the 30's, where the player's age is also in 30's. Additionally, the game awarded 5 points based on the fact that each of the three randomly selected social contact's astrological sign is "Aries", which matches the player's astrological sign.

Total score 312 provides a total score over multiple plays of the game by the player. Thus the score from each round of play is added to the total score 312.

In some embodiments, user interface 300 includes a pay table 314. Pay table 314 provides information to a player regarding the number of credits or points that are provided for particular types of matches. The number of credits for a particular type of match will typically depend on the probability of a match on the particular attribute. In the example illustrated in FIG. 3, a match between a player birthday and a social contact's birthday appearing in the reels is worth 100 credits. A match on a "like" (e.g., the social contact and the player both indicated they liked the same web site, movie, book etc.) is worth 20 credits. A star sign match is worth 10 credits, a location match (e.g., the social contact and the player are located in the same location) is worth 5 credits and a match on gender is worth 1 credit. Those of skill in the art having the benefit of the disclosure will appreciate that other attributes and match amounts are possible and within the scope of the inventive subject matter.

In addition to providing opportunities for game play, the social contacts that appear in the reel positions 306A-C may be potential candidates for addition to the player's social contact group. As noted above, some embodiments of the invention determine a group of social contacts eligible for random selection as part of the game where the group is based on social contacts that have a shared interest in a particular activity or topic. The presentation of social contacts that occurs as part of the game of chance provides a convenient way for the player to find social contacts that they know share their interest in the activity. In some embodiments, the player can click on, or otherwise select the image 306. Upon such selection, the selected social contact's profile data may be presented to the player. For example, the player may be taken to a web page for the social contact on the social network site. The player may then choose to add the social contact to their group of contacts (friends, links etc.).

Figure 4:
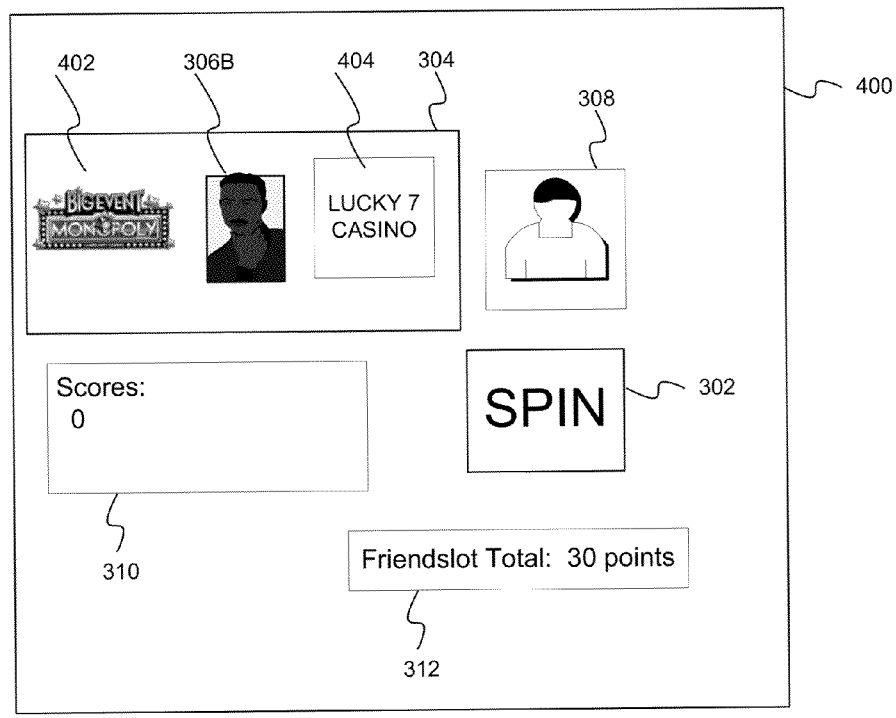

FIG. 4 illustrates an example user interface 400 for a game according to alternative embodiments of the invention. In some embodiments, the reel symbols may include logos or other branding images in addition to the social contacts. In the example illustrated in FIG. 4, reel symbol 402 is a logo for a wagering game that may be provided in a casino. Reel symbol 404 is a logo for a casino. The logo may be selected according to various factors. For example, the logo may be associated with a new wagering game that a manufacturer or casino wishes to promote. Alternatively, the logo may represent a recommendation for the player based on the player's interests. For example, the reel symbol 402 may represent a logo for a wagering game that the system predicts the player would find enjoyable. Similarly, reel symbol 402 may represent a logo for a casino that is recommended to the player as a casino that the player would like to visit, or a casino that has wagering games that the player would find enjoyable. In some embodiments, the logo may be selected resulting in further information about the wagering game or casino being presented to the user. For example, a web page describing the wagering game or casino may be presented to the user.

Reel symbols comprising social contacts and logos may be combined in various ways. For example, in cases where a player has few social contacts available for inclusion in a group, logos representing games, casinos, products or services may be added as reel symbols. Additionally, the mix of logos and social contacts that may be randomly selected to be displayed as part of a game of chance may be used as an incentive to play the game. For example, if a player does not play very often, the mix of logos and social contacts may be adjusted such that the odds of getting a logo are comparatively high (thereby reducing the odds of getting a set of social contacts where the profile attributes match). As the player plays more often, the number of logos presented may be reduced, thereby increasing the odds of getting a set of social contacts having matching profile attributes and thus increasing the odds that the player wins the game of chance.

Figure 5:
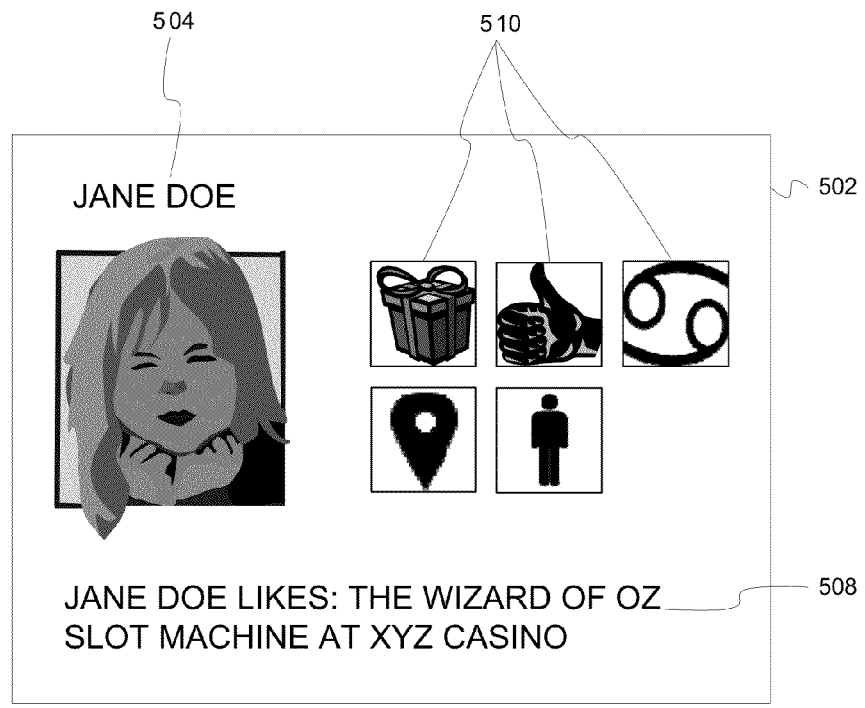
FIG. 5 is a diagram providing further details on a reel symbol according to embodiments.

FIG. 5 is a diagram providing further details on a reel symbol 502 according to embodiments. In some embodiments, reel symbol 502 includes an image 506 associated with a social contact profile (typically a picture selected by the owner of the profile). Reel symbol 502 may also include one or more of a profile name 504, profile status 508, and match icons 510. Profile name identifies the social contact.

Profile status 508 is an area on the reel symbol that contains text or graphics that indicate a current status for the profile. The status may be provided by the profile owner (e.g., the profile owner updated the status using an interface provided by the relevant social network web site) or the status may be provided automatically. For example, a profile status may be automatically updated if the profile owner indicates a "like" for a web site. Alternatively, participating in games, surveys or other options provided by the social network or associated with the social network may cause an automatic update of profile status 508. Profile status 508 may be a static area in some embodiments, while in alternative embodiments, profile status 508 may be a scrolling region of text or graphics.

Match icons 510 are used to indicate various matches between a social contact associated with a reel symbol and a player's social contact data. In the example illustrated in FIG. 5, icons indicating five types of matches are shown. These matches are birthday, likes, astrological sign, geographic position and gender. Those of skill in the art having the benefit of the disclosure will appreciate that other demographic or statistical matches may be represented by other icons. As noted above, each type of match may be worth varying amounts of points. If a demographic aspect of a social contact represented by a reel symbol matches that of the player, then the corresponding icon is highlighted in the reel symbol in some embodiments. Various types of highlighting may be used, including making the icon brighter or blinking, shaking, or rotating the icon.

Figure 6:
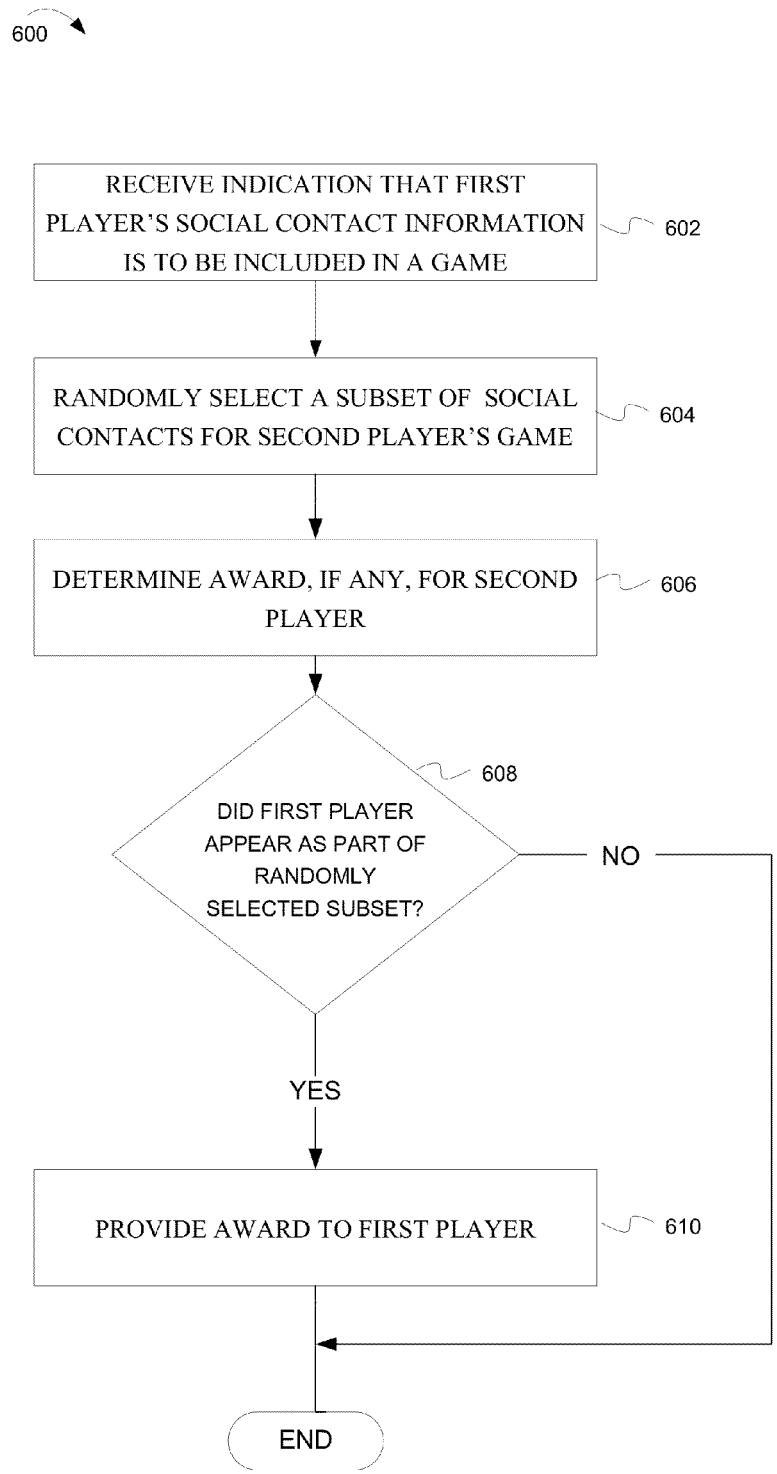
FIG. 6 is a flowchart illustrating a method for using social contact data from a social networking system into a game of chance.

FIG. 6 is a flowchart illustrating a method 600 for awarding points in a game of chance according to embodiments of the invention. The method starts at block 602, where a system executing the methods receives an indication that a first player's social contact information (e.g., data from the player social network system profile) is to be included in the game of chance. The indication may come in a variety of ways. For example, in some embodiments, registering to play the game of chance is used as an indication that the player's social network contact data may be included in the game. In alternative embodiments, the player may use a user interface to indicate that they want their social network contact data to be included in the game. In general, any indicator that provides an "opt-in" functionality may be used.

At block 604, the game randomly selects a subset of social contacts as part of a second player's play of the game of chance. The selection of a subset of social contacts may be performed as described above with reference to block 204 (FIG. 2).

At block 606, the game determines an award for the second player. The award may be determined as described above with reference to block 208 (FIG. 2).

At block 608, the game determines if the first player was included as part of the randomly selected set of social contacts. In some embodiments, the first player may be awarded points based on the first player's inclusion in the randomly selected subset of social contacts. In alternative embodiments, in order for the first player to be awarded points, the first player must appear in the randomly selected subset of social contacts and the second player must also have won points based at least in part on at least one of the first player's attribute values contributing to a match of the other social contact's attribute values. In other words, in order for the first player to be awarded points, the second player must have won an award.

As will be appreciated from the above, in some embodiments, a player need not be playing the game in order to be awarded points. In fact, the player need not even be present or logged in to a social networking site in order be awarded points.

In some embodiments, the game may provide or make available to a first player a list or report of other players where the first player's profile was randomly selected to appear during the other players' game play. Such a feature provides incentive for the first player to check back with the game to determine if the first player received any points or other awards while the first player was away from the game.

In addition to the operations described above in FIGS. 2-5, various embodiments may incorporate additional features. For example, in some embodiments, a leader board may be maintained for the game of chance. The leader board presents the top scoring players along with their scores. The leader board may be global in scope or it may be limited to a particular country, region, state, city or other geographic region. Further, the leader board may be limited to players having a particular interest, such as players interested in a particular sport, sports team or other activity.

In some embodiments, social contacts may be ranked based on the number of points or awards they have earned playing the game of chance. The ranking may then be used by the game of chance when awarding points to a player. For example, an award amount may be enhanced or multiplied based on the ranking of a social contact included in the randomly selected subset of social contacts.

In some embodiments, players may be organized into leagues or tournaments, where the system keeps track of the scoring for the player in the league or tournament. In such embodiments, a leader board may display only those players in the league or those players participating in the league or tournament. The league or tournament may include a draft of social contacts to be included in the player's group of social contacts (i.e., a pool of contacts) that are available for random selection as part of the game play. As part of the draft, the player may select social contacts for inclusion in their group of social contacts. In embodiments where rankings of social contacts may be used to provide additional points or point multipliers, it is therefore advantageous for the player to be associated with social contacts having a high ranking.

Some embodiments provide a challenge mode for game play. In the challenge mode, players compete "head to head" with one another, with the winner staying on to challenge another player. The game play in challenge mode may be in real time such that the players are competing against one another simultaneously. The challenge mode may be part of league or tournament play, or it may be separate from a league or tournament.

In some embodiments, a player may be limited to a certain number of plays of the game, or a certain duration of play of the game. In such embodiments, a player may use points or even monetary value to purchase more rounds of play or more time to play.

In some embodiments, a player may be required to spend points in order to include social contacts in the group of social contacts that is used as the basis for random selection. Similarly, the player may be required to spend points for the opportunity to be included in a social contact group that may be used to as the basis for random selection in another player's game.

Additionally, a player may spend points to acquire a particular background, reel color or other optional feature of the game of chance, or of another game such as a wagering game provided by a casino operator. Similarly, certain features of a game may require sharing of a certain level of profile information with the game application. Advanced or more desirable features may require sharing more information, more detailed information with the game application.

Figure 7:
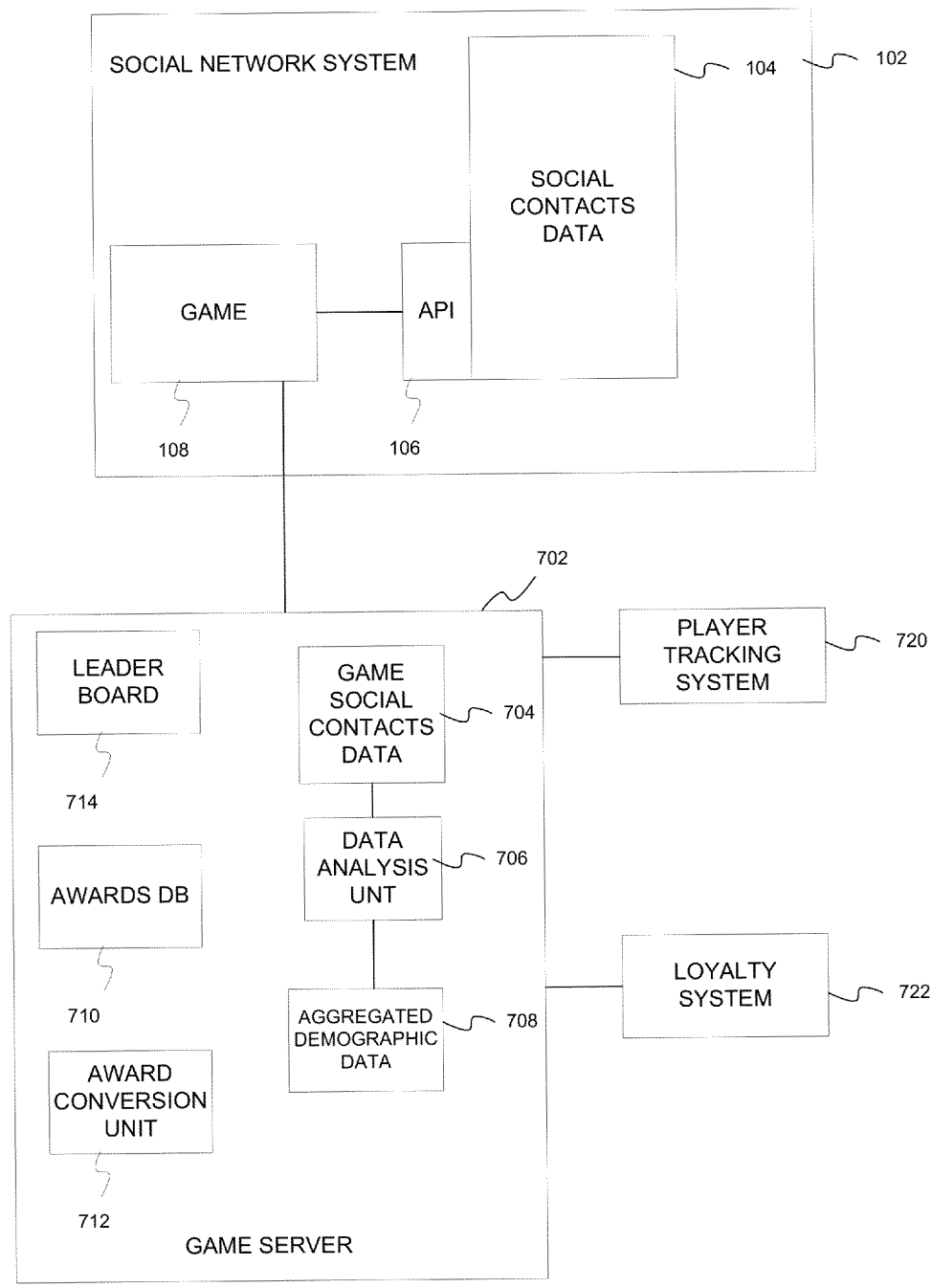
FIG. 7 is a block diagram illustrating a system for using awards from a game of chance incorporating social network data according to embodiments of the invention.

While FIGS. 1-6 have described systems, methods, and user interfaces for a game of chance having mechanics that incorporate social contacts and social contact data, FIG. 7 describes the interaction of the game with other systems.

Example System Architecture

FIG. 7 is a block diagram of a system 700 for analyzing and using social contact data and award data. In some embodiments, system 700 includes a social network system 102 and a game server 702. Additionally, system 700 may optionally include or interface with one or more of a player tracking system 720 or loyalty system 722. Player tracking system 720 is a system that tracks play of wagering game machines in a casino or family of casinos by a player. Typically the player is assigned a player tracking card that associates the player with a player tracking account. The player inserts the card into a card reader on the wagering game machine. The player tracking system can thus track which wagering games the player uses and the duration of play of the wagering games by the player. In addition, the player tracking system may store demographic data for the player. In return for allowing the casino to track wagering game usage of a player, the player is typically awarded loyalty points that may be exchanged for goods or services at the casino.

Loyalty system 722 is similar to player tracking system 720. Loyalty system 722 comprises a system that tracks purchases of goods and services from a registered user. Examples of such loyalty systems include systems that implement a frequent flyer program, frequent buyer program, frequent renter program etc.

Game server 702 may include units that analyze social contact data received from multiple sources. For example, game server 702 may include a data analysis unit 706 that receives game social contact data 704 and applies various heuristics to the data to make inferences, predictions or recommendations about players based on the data. Game social contact data 704 will typically include social contact data received from a social network site for players of game 108, the player social contacts, and other social contacts that have allowed their social contact data to be shared with the game 108.

Game server 702 may maintain an awards database 710. Awards database 710 may be used to maintain data such as points earned by a player, or data representing trophies, medals, badges, identifiers for unlocked games, features etc. In some embodiments, awards database 710 may be used to populate data for a leader board 714. Leader board 714 identifies the top players of a game 108. The leader board may be for all players of game 108. Alternatively, the leader board 714 may present the top players and scores for players in a geographic region such as a country, state, province, city etc., or the players in a league or tournament. Further, the leader board 714 may be for players having a particular interest, such as players interested in a particular sport, sports team or other activity.

In some embodiments, data analysis unit 706 may include demographic and purchase or usage data from either or both player tracking system 720 and loyalty system 722. Data from player tracking system 720 and loyalty system 722 may be matched with social contacts in game social contact data 704 to produce aggregated demographic data 708. The addition of such data allows the data analysis unit to potentially provide better inferences, predictions or recommendations to interested parties and to provide a more complete view of a social contact. For example, a casino may use the aggregated data to provide recommendations or targeted advertising to a player regarding wagering games or casino services that may be of interest to the player.

Game server 702 may also include an award conversion unit 712. In some embodiments, award conversion unit 702 converts points awarded to a player of game 108 into a different point system, for instance a point system maintained by player tracking system 720 or by loyalty system 724. For example, points awarded during play of game 108 may be converted into frequent flyer points.

Figure 8:
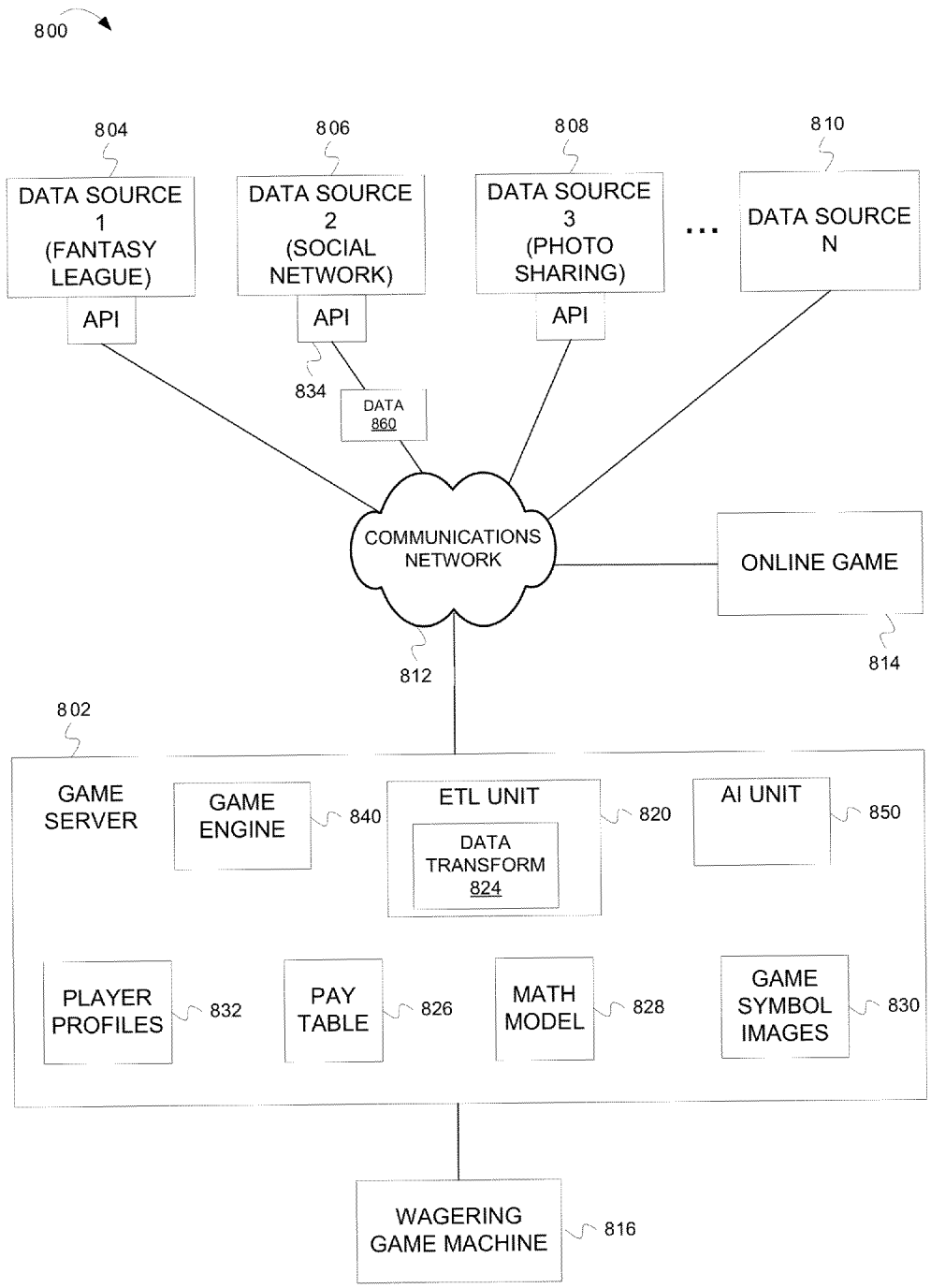
FIG. 8 is a block diagram illustrating a system that obtains data from one or more of multiple third party systems for incorporation into a game of chance according to embodiments.

FIG. 8 is a block diagram illustrating a system 800 that obtains data from one or more of multiple third party systems for incorporation into a game of chance according to embodiments. As discussed above, such third party systems may be social network systems such as Facebook, Twitter, LinkedIn, Google+, Classmates.com, 4square etc. Additionally, third party systems may include systems that maintain data for fantasy sports leagues, photo sharing sites, online address book systems or other systems that maintain demographic info.

The data obtained from the third party systems may be aggregated or used separately to provide games and game elements to players. In some embodiments, system 800 includes a game server 802 coupled to one or more data sources 804-810 through a communications network 812. System 800 may include either or both a wagering game machine 816 and online game 814. Communications network 812 may be any type of network, including local area networks, wide area networks, private networks, public networks, or any combination thereof. In some embodiments, communication network 812 includes the Internet.

Game server 802 provides games or game elements for online games of chance 814 or wagering games on wagering game machine 816. Such game elements can include one or more of pay tables 826, math models 828 or game symbol images 830. Pay table 826 defines payout amounts for various combinations of symbols that may be randomly generated by a wagering game. For example, pay table 826 may define payout amounts for combinations of reel symbols, cards, dice or other game elements. Math model 828 defines parameters and functions for various elements that define in mathematical terms aspects of a game. Game symbol images 830 are images that appear on game elements such as reel symbols, card faces, die faces or other game elements.

Data sources 804-810 are third party systems (with respect to game server 802), that provide data that may be used by game server 802 to customize games provided as on line games 814 or games presented on wagering game machine 816. Data sources 804-810 may be any type of system that can provide data for use in customizing a game. For example, in some embodiments, data source 804 is a system that maintains data for a fantasy sports league. The fantasy sports league can be any type of sports league, including football, baseball, basketball, hockey etc. In some embodiments, data source 806 can be a social networking system such as Facebook, LinkedIn, Google+, Twitter, Classmates.com, 4square etc. In some embodiments, data source 808 can be a photo sharing site such as Flickr. Data source 810 represents any of a multitude of other potential data sources such as systems providing financial data, investment data, dating systems (e.g., "match.com"), weather data, travel data etc. Data source 810 may also be a repository of data for an online social game (e.g., "Farmville") or gaming system (e.g., Xbox Live). The inventive subject matter is not limited to any particular data source. Further, it should be noted that game server 802 may have access to multiple data sources and can use the data sources alone or in combination to provide games or game elements.

Game server 802 includes an extract, transform and load (ETL) unit 820 that obtains data from a data source and performs operations on the obtained data to transform the data into a form that can be used readily by the server to provide customized games. In some embodiments, ETL unit 820 obtains data through an API 834. API 834 is an interface that is provided and published by the third party data source to enable systems to obtain data from the data source. In some embodiments, API 834 may be a web service interface. As an example API, Facebook provides a "Facebook Data Connect" API that allows systems to obtain data from the Facebook social networking system. Other APIs that may be used include SOAP or JSONG. In alternative embodiments, game server 802 may obtain data from a structured file (e.g., an XML file) that is transferred from the data source to game server 802 over network 812.

In some embodiments, ETL unit 820 provides normalization and mapping functions using a data transformation process 824. Normalization may include scaling or otherwise transforming the data so that the third party data can conform to the requirements of a pay table or math model used by a game provided by the game server. Normalization is desirable in some embodiments, because the normalized data can provide a better basis for randomly selecting or mapping data elements in the data source.

ETL unit 820 may also map data received from data sources 804-110 to game elements (e.g., pay tables, math models, game symbol images etc.) or game templates for games provided by game server 802. Various types of mapping are possible and will vary depending on the type of source data. For example, in the case of fantasy sports leagues, points accumulated by a sports player based on their performance over a period of time may be used to map the sports player's image and performance data to a game symbol such as a reel symbol, a card face, or the face of a die. An online game or wagering game player may specify their fantasy league team, and the team's players' fantasy points and other data may be used as part of the mapping. Thus the game symbols are personalized to the wagering game player based on statistics taken from the player's fantasy sports team.

As noted above, other types of data can be used to personalize or customize a game of chance or a wagering game. Data from a game player's stock portfolio may be used. As an example, stock symbols may be mapped to game symbols. The stock symbols may be mapped such that the highest gaining stocks could be mapped to symbols with a higher payback. Similarly, demographic data obtained from a social network site using the wagering game player login credentials may be used to map images of friends to game symbols. Likewise, photos obtained from photo sharing sites may be mapped to game symbols using metadata associated with the photos.

Mapping may be accomplished in various ways. In some embodiments, a game designer may provide a mapping of various data elements in various data sources to game elements of a game. In alternative embodiments, a game player can specify a mapping of data elements to game elements. For example, a game player may choose to map a fantasy football team to game symbols. The game player may identify particular data elements the player is interested in such as fantasy points, college, position etc. that are to be used in the mapping. In further alternative embodiments, heuristics may be employed that analyze a data source's data elements and automatically determines a mapping from data elements to game elements.

Thus in some embodiments, game server 802 obtains data 860 obtained from a third party data source. The data may be pushed to game server 802 or the data may be pulled by game server 802 from a data source. After obtaining the data, a data transformation process transforms the data (e.g., normalizes, scales or otherwise transforms the data) into a form that can be used by a game engine 840 to provide games such as online game 814 or games on a wagering game machine 816. Although shown as part of game server 802, game engine 840 may reside within a social networking site, within a wagering game machine, within an online game client.

Player profiles 832 may be used by a game server 802 to determine which data sources to obtain data from. Player profiles are typically associated with a player identification. The profile for a player in some embodiments includes various data sources that the player is interested in using to personalize or customize a game. Upon logging in to an online game or wagering game, for example by inserting a player tracking card or entering login credentials, the game server can use data from the data sources in the game player's profile to customize a wagering game or online game for the game player.

In some embodiments, an AI (Artificial Intelligence) unit 850 analyzes the data by applying rule sets or other heuristics to determine which data elements from data sources 804-810 to use in a game. AI unit 850 may filter duplicate data. Further, AI unit 850 may determine the objects and data elements that are to be used to meet desired characteristics for the game. In some embodiments, the time that a player or contact most recently visited a web site or played a game may be used to determine whether the data is included for a game. The game may include data for most recently visited sites. In alternative embodiments, the amount of time a player or contact spent at a site may be used to determine if the data is to be included for a game. The game may include data from sites where the player or contact spent a relatively greater amount of time and exclude data from sites where the player or contact spent a relatively lesser amount time.

As noted above, data from multiple sources may be aggregated to provide a larger domain of data for a game to use. For example, a game may use social contact data from Facebook, LinkedIn, and classmates.com in order to provide a broader range of social contact data to work with than would be available from a single source. The aggregated data may be used to create a "collage" of a players activities over a particular time frame (for example, a week). The collage of activities may then be used to match against the player's social contacts with points awarded as discussed above. For example, aggregated location data may be used to determine various locations that the player visited during the past week. Locations that the player's social contacts visited during the same time period may be used as matching criteria for a game, with points awarded based on the social contact having visited the same place that the player visited. Alternatively, location data could be used to determine a distance traveled and the distance used to match with the player's social contacts.

Aggregated data may be used as a secondary data source to supplement data from a primary source. For example, assume that a player chooses to play a game using their social contacts from a first social networking site. If the player does not have a sufficient number of contacts in the first social networking site to meet desired probabilistic behavior for the game, data from a second social network site may obtained and used to supplement the data from the first site.

The aggregated data may also be analyzed and used as a qualifier for particular types of games that may be offered to the player. For example, if the analyzed data indicates that the player is interested in financial subjects, then games with a financial theme may be offered to the player.

In some embodiments, a player may be awarded additional prizes or a pay table award amount may be increased if a social contact appears across multiple sources of data.

In alternative embodiments, other data besides social contact data is used instead of or in addition to social contact data to provide online games or wagering games. For example, fantasy sports league data, financial data, or other types of data may be used in various embodiments.

Figure 9:
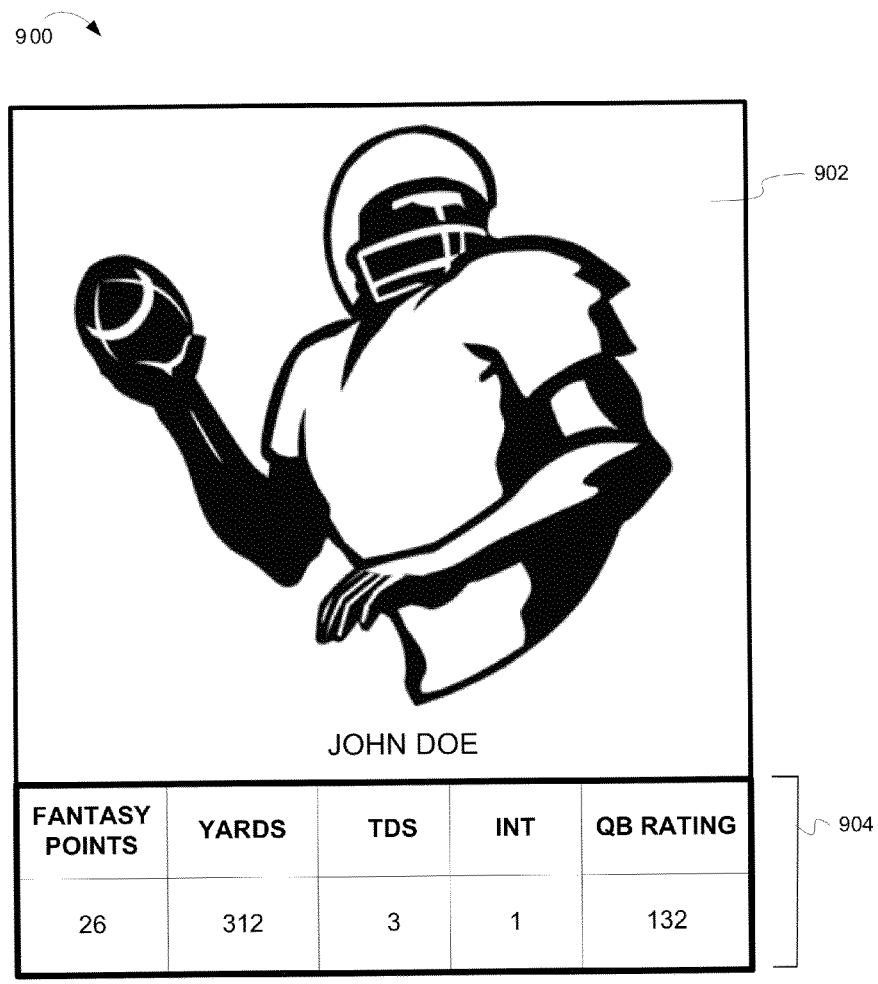
FIG. 9 illustrates an example game symbol used in a fantasy sport league based game.

FIG. 9 illustrates an example game symbol 900 used in a fantasy sport league based game. In the example illustrated in FIG. 9, fantasy football league data is used. Symbol 900 includes an image area 902 that comprises an image of a football player from a wagering game player's fantasy football league team. Statistics area 904 provides one or more statistics for the football player mapped to the game symbol 900. The statistics area may display a subset of available statistics, and may include fewer or more statistics than were used in the mapping. Alternatively, the statistics area may be a scrolling region on the symbol, with statistics scrolling across the statistics area. While the example illustrated in FIG. 9 shows a horizontal statistics area on the bottom of the game symbol, those of skill in the art having the benefit of the disclosure will appreciate that a statistics area could be presented vertically or some other orientation, and at the top or sides or other position of the game symbol.

The statistics area may include various data and statistics regarding the player mapped to the game symbol. Such data and statistics may include in various embodiments current injury status (out (O), doubtful (D), questionable (Q), probable (P))) and abbreviated statistics for his most recent week of play (e.g., rush yards, receiving yards, passing yards, number of touchdowns), player name, uniform number, position, team name, years of experience, college, height, weight, date of birth, most recent week's statistics, season-to-date statistics, player news, etc. Fantasy points for current week can be based on either a particular league's scoring system or a typical scoring system.

In some embodiments, fantasy sports league data may be used in a matching based game similar to that as described above for social contact data. In such embodiments, attributes of one or more members of a player's fantasy sports team may be compared with similar attributes of other fantasy sports teams in a league. Upon detecting a match between the attributes, the player may be awarded points or credits. Using a fantasy football league as an example, attributes such as yards gained, touch downs, college attended, years in league etc. may be compared and upon detecting a match, credits may be awarded. Those of skill in the art having the benefit of the disclosure will appreciate that other attributes in a football league may be used, and that other attributes in other fantasy sports teams may be used and are within the scope of the inventive subject matter.

The data may be used in other ways, and as discussed above, the data may be mapped to symbols of a casual game or wagering game. FIG. 10 illustrates an example mapping 1000 of third party data to game symbols. In the example illustrated in FIG. 10, a wagering game player's fantasy sports league team data is mapped to symbols, with the current weeks fantasy points being used to map from players in the league to certain symbols of a slots based wagering game. As indicated in the "Symbol Hierarchy", the wagering game incorporates high symbols, medium symbols and low symbols along with a bonus symbol and a wild symbol. High symbols are associated with high payout amounts, medium symbols are associated with medium payout amounts, and low symbols are associated with low payout amounts. The math model 828 (FIG. 8) associated with the symbol hierarchy may be a predetermined math model (i.e., each reel strip has a predetermined layout of symbols so as to yield winning symbol combinations having associated payouts and probabilities of occurrence, thereby yielding a slot game with a predetermined overall payback percentage, e.g., 90%). Winning symbol combinations may, for example, be three, four, and five occurrences of a particular symbol appearing "left-to-right" along an active payline.

A bonus symbol, if it appears on a reel, causes a bonus game to commence. In some embodiments, a predetermined number of bonus symbols, e.g., three, are required in order to trigger a bonus game. The bonus symbols need not appear on a payline in order to trigger a bonus game. A wild symbol matches any symbol, with the potential exception of the bonus symbol.

As illustrated in the example shown in FIG. 10, the player with the highest fantasy point total for the current week is mapped to the bonus symbol, the player with the next highest fantasy point total for the current week is mapped to the wild symbol, followed by mapping players to the high, medium and low symbols in descending order of fantasy points for the current week. Those of skill in the art having the benefit of the disclosure will appreciate that other mappings are possible and within the scope of the inventive subject matter. In the example shown in FIG. 10, the mapping was based on a current week's data. The mapping may be based on other time periods such as a year-to-date, current season, previous season etc. Additionally, other data or statistics may be used in the mapping. For example, the wild symbol may be assigned to the player whose performance statistics exhibited the largest variance from their average performance. Thus a player who had a mediocre or even low average rating, but a much better than normal week, may be assigned a symbol. In further embodiments, improvement in player statistics may be used to map players to game symbols.

As discussed above, other types of data may be used in addition to or instead of sports data. For instance, a wagering game player's stock portfolio may be mapped to game symbols. As an example, the wagering game player's highest performing stock may be assigned to the bonus symbol, with other high performing stocks assigned to the wild, high, medium and low symbols.

Data from corporate loyalty systems may be used to create a matching based slots game. For example, a coffee shop may maintain data in a customer loyalty system that tracks types of drinks ordered by customers. The data may be used in matching based slots games in several ways. In some embodiments, the type of drink ordered may be a comparison criterion. In such embodiments, points are awarded to social contacts that ordered the same type of drink. In alternative embodiments, the data may be used as a qualifier to enter a social contact based slots game. In such embodiments, the player is allowed to play a social contact based slots game if they have ordered a particular type of drink. The particular type of drink may be specified by the shop proprietor as a way of promoting sales of that type of drink. The type of drink may be used in the slots game as a bonus symbol.

Figure 11:
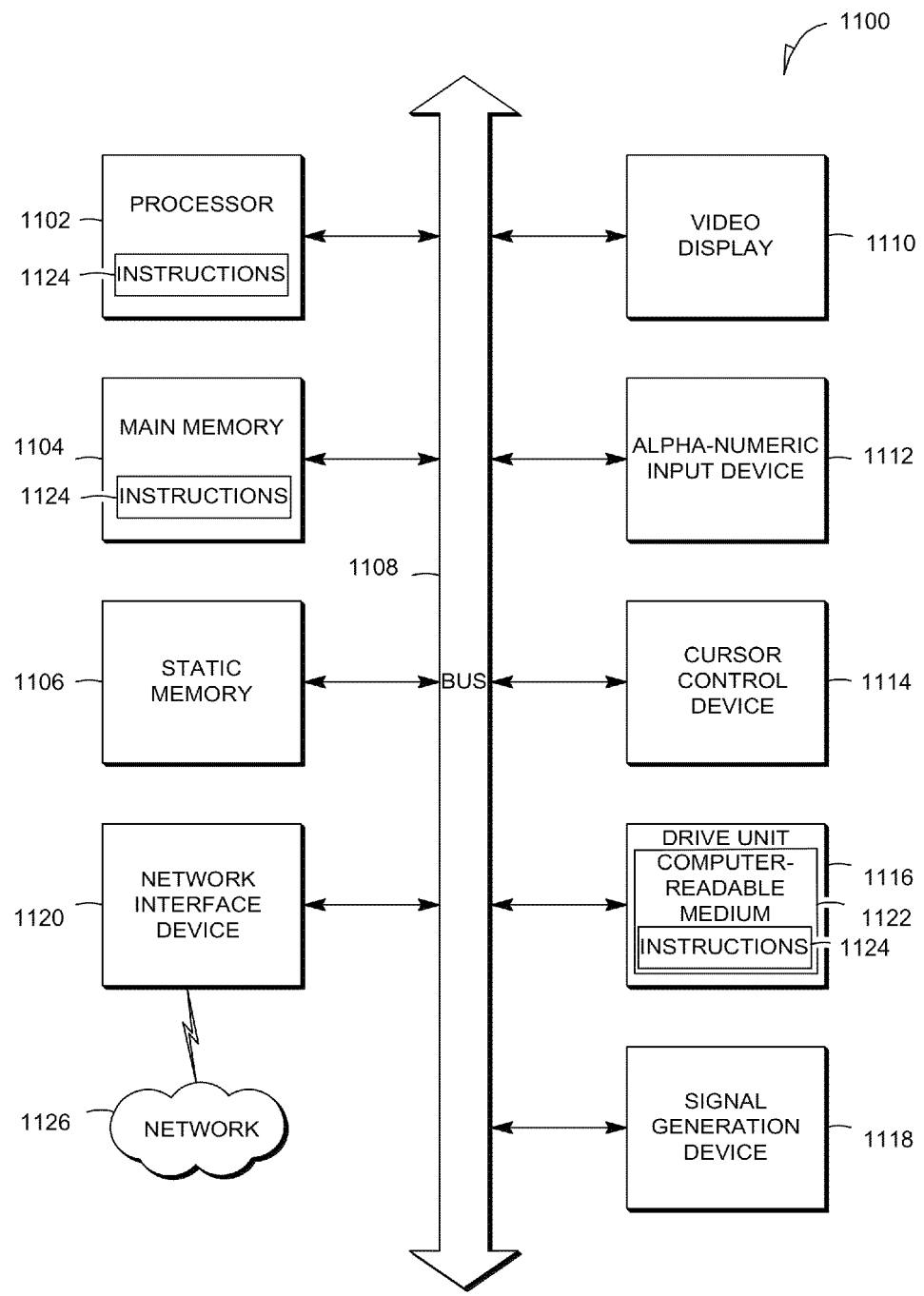
FIG. 11 is a block diagram of an example embodiment of a computer system upon which embodiments of the inventive subject matter can execute.

FIG. 11 is a block diagram of an example embodiment of a computer system 1100 upon which embodiments of the inventive subject matter can execute. The description of FIG. 11 is intended to provide a brief, general description of suitable computer hardware and a suitable computing environment in conjunction with which the invention may be implemented. In some embodiments, the invention is described in the general context of computer-executable instructions, such as program modules, being executed by a computer. Generally, program modules include routines, programs, objects, components, data structures, etc., that perform particular tasks or implement particular abstract data types.

As noted above, the system as disclosed herein can be spread across many physical hosts. Therefore, many systems and sub-systems of FIG. 11 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 11, a hardware and operating environment is provided that is applicable to both servers and/or remote clients.

With reference to FIG. 11, an example embodiment extends to a machine in the example form of a computer system 1100 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 1100 may include a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). In example embodiments, the computer system 1100 also includes one or more of an alpha-numeric input device 1112 (e.g., a keyboard), a user interface (UI) navigation device or cursor control device 1114 (e.g., a mouse), a disk drive unit 1116, a signal generation device 1118 (e.g., a speaker), and a network interface device 1120.

The disk drive unit 1116 includes a machine-readable medium 1122 on which is stored one or more sets of instructions 1124 and data structures (e.g., software instructions) embodying or used by any one or more of the methodologies or functions described herein. The instructions 1124 may also reside, completely or at least partially, within the main memory 1104 or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media that can store information in a non-transitory manner, i.e., media that is able to store information for a period of time, however brief. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 1124 may further be transmitted or received over a communications network 1126 using a transmission medium via the network interface device 1120 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

What is claimed is:

1. A method comprising:
storing, in a machine-readable medium communicably coupled to one or more processors, an indication that a first social contact of a plurality of social contacts desires to be included in an electronic game of chance provided on a computerized social network system;
randomly selecting, based on an output of a random element generator, a subset of the plurality of social contacts;
presenting graphical objects representing the subset of the plurality of social contacts on a display during operation of the electronic game of chance by a player;
determining, by the one or more processors, that a profile attribute of each of the subset of the plurality of social contacts stored in the machine-readable medium matches a profile attribute of the player stored in the machine-readable medium;
determining, by the one or more processors, that the first social contact is included in the subset of the plurality of social contacts; and
in response to determining, by the one or more processors, that the profile attribute of each of the social contacts in the subset of the plurality of social contacts stored in the machine-readable medium matches the profile attribute of the player stored in the machine-readable medium and that the first social contact is included in the subset, electronically communicating, via a network interface, an award to the first social contact.

2. The method of claim 1, further comprising determining that the subset of the plurality of social contacts resulted in a winning outcome for the player.

3. The method of claim 1, and further comprising providing a report to the first social contact indicating that the first social contact was included in the subset of the plurality of social contacts.

4. The method of claim 1, wherein the graphical objects representing the subset of the plurality of social contacts comprise reel elements for reels of a slots based game.

5. The method of claim 1, wherein the plurality of social contacts are associated with the player.

6. The method of claim 1, wherein the award includes one or more of points, access to an online game, access to a feature of a game, access to a bonus game, a discount on a good or service, a virtual trophy, a virtual medal, or a virtual badge.

7. A system comprising:
one or more processors;
a memory coupled to the one or more processors;
a machine readable medium communicably coupled to the one or more processors, the machine readable medium to store a plurality of social contacts and an indication that a first social contact desires to be included in an electronic game of chance and executable by the one or more processors from the memory;
a network interface communicably coupled to the one or more processors; and
a display communicably coupled to the one or more processors;
wherein the electronic game of chance is configured to:
randomly select, based on an output of a random element generator, a subset of the plurality of social contacts of a player;
present graphical objects representing the subset of the plurality of social contacts on the display;
determine that a profile attribute of each of the subset of the plurality of social contacts stored in the machine readable medium matches a profile attribute of the player stored in the machine readable medium;
determine that the first social contact is included in the subset of the plurality of social contacts; and
electronically communicate via the network interface an award to the first social contact in response to determining, by the one or more processors, that the profile attribute of each of the social contacts in the subset of the plurality of social contacts stored in the machine readable medium matches the profile attribute of the player stored in the machine readable medium and that the first social contact is included in the subset of the plurality of social contacts presented on the display.

8. The system of claim 7, wherein the electronic game of chance is further configured to determine that the subset of the plurality of social contacts resulted in a winning outcome for the player.

9. The system of claim 7, wherein the system is configured to provide a report to the first social contact indicating that the first social contact was included in the subset of the plurality of social contacts.

10. The system of claim 7, wherein the electronic game of chance is a slots based game and wherein the graphical objects comprise reel elements for reels of the slots based game.

11. The system of claim 7, wherein the plurality of social contacts are associated with the player.

12. A machine-readable storage medium having stored thereon machine executable instructions, that when executed, cause one or more processors to perform operations for an electronic game of chance, the operations comprising:
storing an indication that a first social contact desires to be included in the electronic game of chance;
randomly selecting, based on an output of a random element generator, a subset of a plurality of social contacts of a player;

presenting graphical objects representing the subset of the plurality of social contacts on a display during operation of the electronic game of chance by the player;

determining that a profile attribute of each of the subset of the plurality of social contacts matches a profile attribute of the player;

determining that the first social contact is included in the subset of the plurality of social contacts; and electronically communicate via a network interface an award to the first social contact in response to determining, by the one or more processors, that the profile attribute of each of the social contacts in the subset of the plurality of social contacts matches the profile attribute of the player and that the first social contact is included in the subset of the plurality of social contacts.

13. The machine-readable storage medium of claim 12, wherein the operations further comprise determining that the subset of the plurality of social contacts resulted in a winning outcome for the player.

14. The machine-readable storage medium of claim 12, wherein the operations further comprise providing a report to the first social contact indicating that the first social contact was included in the subset of the plurality of social contacts.

15. The machine-readable storage medium of claim 12, wherein the graphical objects representing the subset of the plurality of social contacts comprise reel elements for reels of a slots based game.

16. The machine-readable storage medium of claim 12, wherein the plurality of social contacts are associated with the player.

17. The machine-readable storage medium of claim 12, wherein the award includes one or more of points, access to an online game, access to a feature of a game, access to a bonus game, a discount on a good or service, a virtual trophy, a virtual medal, or a virtual badge.

18. The machine-readable storage medium of claim 12, wherein the plurality of social contacts share an interest, and wherein the award is selected in accordance with the interest.

19. The machine-readable storage medium of claim 12, wherein the award comprises points and wherein the operations further comprise adding the points to an account associated with the first social contact.

20. The machine-readable storage medium of claim 12, wherein the operations further comprise:

receiving a fee from the first social contact; and in response to receiving the fee, making the first social contact eligible for inclusion in the subset of the plurality of social contacts.

* * * * *